US009680604B2

(12) United States Patent
Lim et al.

(10) Patent No.: US 9,680,604 B2
(45) Date of Patent: Jun. 13, 2017

(54) METHOD AND APPARATUS FOR DEVICE TO DEVICE COMMUNICATION

(75) Inventors: Chi-Woo Lim, Suwon-si (KR);
Kyung-Kyu Kim, Seoul (KR);
Seung-Hoon Park, Seoul (KR);
Nam-Yoon Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 120 days.

(21) Appl. No.: 13/584,169

(22) Filed: Aug. 13, 2012

(65) Prior Publication Data
US 2013/0039440 A1     Feb. 14, 2013

(30) Foreign Application Priority Data

Aug. 11, 2011 (KR) ................. 10-2011-0080055
Aug. 8, 2012 (KR) ................. 10-2012-0086759

(51) Int. Cl.
*H04L 1/00* (2006.01)
*H04L 5/00* (2006.01)
(Continued)

(52) U.S. Cl.
CPC ............ *H04L 1/0061* (2013.01); *H04L 1/04* (2013.01); *H04L 5/0053* (2013.01);
(Continued)

(58) Field of Classification Search
CPC . H04W 25/383; H04W 48/16; H04W 48/005; H04W 4/008; H04W 84/08;
(Continued)

(56) References Cited

U.S. PATENT DOCUMENTS 7,961,708 B2 * 6/2011 Li et al. .............. 370/350
2003/0076852 A1   4/2003 Fukui
(Continued)

FOREIGN PATENT DOCUMENTS

CN    101288063    10/2008
CN    101790852     7/2010
(Continued)

OTHER PUBLICATIONS

European Search Report dated Mar. 16, 2015 issued in counterpart application No. 12821490.5-1851.
(Continued)

*Primary Examiner* — Kwang B Yao
*Assistant Examiner* — Ricardo Castaneyra
(74) *Attorney, Agent, or Firm* — The Farrell Law Firm, P.C.

(57) ABSTRACT

Methods and apparatus are provided for searching for a peripheral device and transmitting device information in a device-to-device service. First information is transmitted using a first tone in a first region of a search duration. A second tone is determined by transposing a subcarrier index and a symbol index of the first tone. The first information is transmitted through the second tone in a second region of the search duration. First information of a peripheral device is received in the first and the second region of the search duration. The second information is transmitted through a resource region corresponding to the first tone in a third region of the search duration. Second information of the peripheral device is received in the third region of the search duration. Device information of the peripheral device is determined by combining the first and second information of the peripheral device.

22 Claims, 8 Drawing Sheets

(51) Int. Cl.
*H04L 27/26* (2006.01)
*H04W 56/00* (2009.01)
*H04L 1/04* (2006.01)
*H04W 28/06* (2009.01)
*H04W 72/00* (2009.01)
*H04W 76/02* (2009.01)
*H04W 92/18* (2009.01)

(52) U.S. Cl.
CPC ......... *H04L 27/2666* (2013.01); *H04W 56/00* (2013.01); *H04W 28/06* (2013.01); *H04W 72/00* (2013.01); *H04W 76/023* (2013.01); *H04W 92/18* (2013.01)

(58) Field of Classification Search
CPC ..... H04W 84/12; H04W 56/00; H04W 92/18; H04W 72/00; H04W 76/023; H04W 28/06; H04L 67/104; H04L 27/2657; H04L 27/00; H04L 1/0065; H04L 1/0001; H04L 29/06163; H04L 5/003; H04L 1/0061; H04L 1/04; H04L 5/0053; H04L 27/2666; H04J 4/00
USPC .... 370/310, 310.2, 313, 315, 328, 329, 330, 370/338, 341
See application file for complete search history.

(56) References Cited

U.S. PATENT DOCUMENTS

| | | |
|---|---|---|
| 2006/0040670 A1 | 2/2006 | Li et al. |
| 2008/0037487 A1 | 2/2008 | Li et al. |
| 2009/0016248 A1 | 1/2009 | Li et al. |
| 2009/0327395 A1 | 12/2009 | Park et al. |
| 2010/0110929 A1* | 5/2010 | Li et al. .............. 370/254 |
| 2011/0032834 A1 | 2/2011 | Kim et al. |

FOREIGN PATENT DOCUMENTS

| | | |
|---|---|---|
| CN | 102047703 | 5/2011 |
| EP | 2 192 807 | 6/2010 |
| JP | 2006-115354 | 4/2006 |
| JP | 2010-533428 | 10/2010 |

OTHER PUBLICATIONS

Australian Pre-Examination Processing Notice dated Feb. 16, 2016 issued in counterpart application No. 2012295038, 2 pages.
Chinese Office Action dated Apr. 20, 2016 issued in counterpart application No. 201280039243.5, 8 pages.
Australian Examination Report dated Apr. 27, 2016 issued in counterpart application No. 2012295038, 2 pages.
Japanese Office Action dated May 30, 2016 issued in counterpart application No. 2014-524936, 2 pages.
Notice of Acceptance dated Aug. 2, 2016 issued in counterpart application No. 2012295038, 2 pages.

* cited by examiner

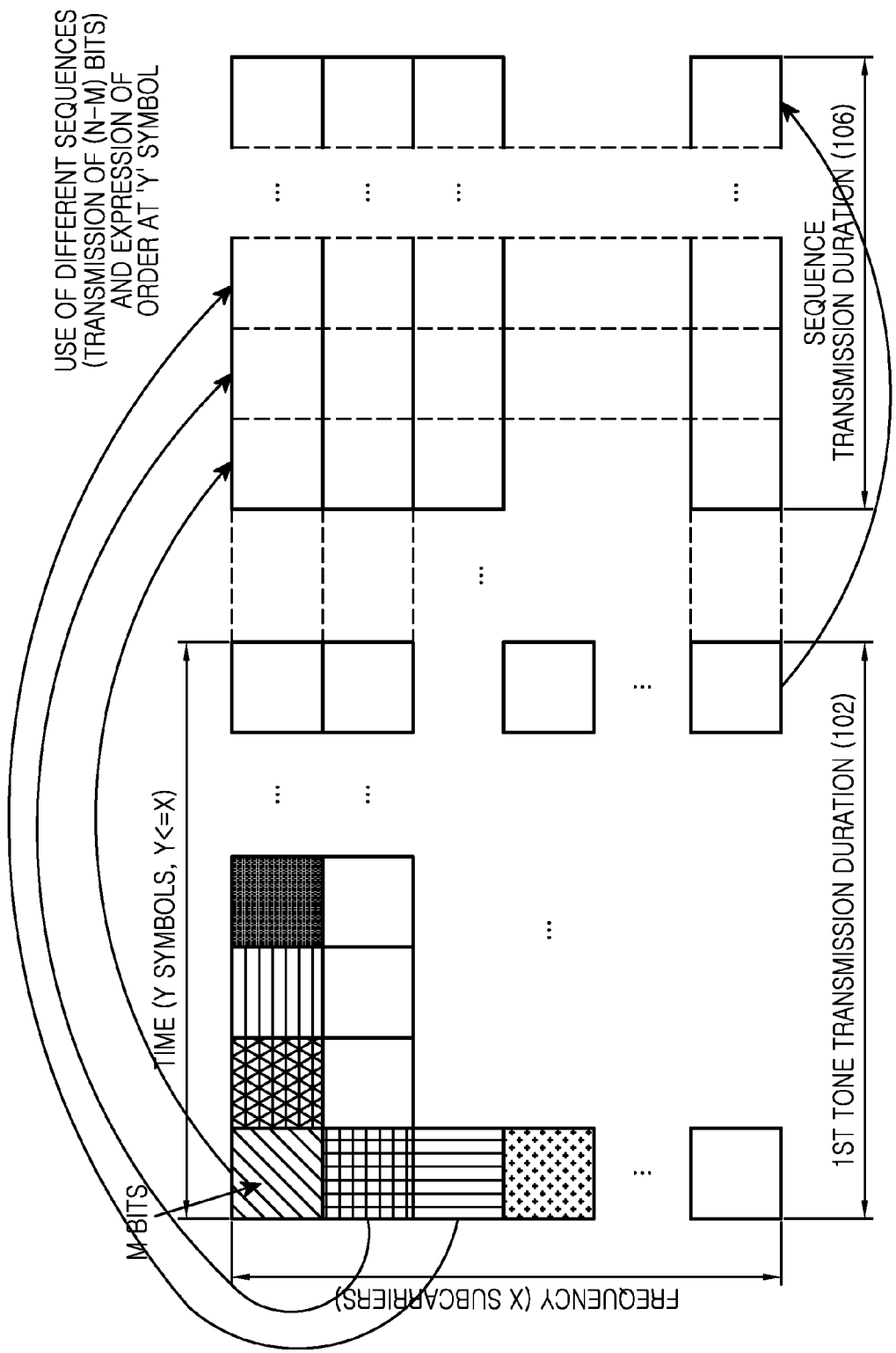

METHOD AND APPARATUS FOR DEVICE TO DEVICE COMMUNICATION

PRIORITY

This application claims priority under 35 U.S.C. §119(a) to a Korean Patent Application filed in the Korean Intellectual Property Office on Aug. 11, 2011 and assigned Serial No. 10-2011-0080055 and a Korean Patent Application filed in the Korean Intellectual Property Office on Aug. 8, 2012 and assigned Serial No. 10-2012-0086759, the contents of which are incorporated herein by reference.

BACKGROUND OF THE INVENTION

1. Field of the Invention

The present invention relates generally to communication systems, and more particularly, to an apparatus and a method for supporting a Device To Device (D2D) service in an electronic device.

2. Description of the Related Art

Users of communication devices require services capable of obtaining or sharing desired information. Smart phones and tablet Personal Computers (PCs) provide environments capable of acquiring and sharing information through a wireless communication system. However, the wireless communication system can only acquire and share information when a communication infrastructure is built. Also, it is difficult to efficiently provide real-time information because of the complexity of a system or a temporal delay.

A Device To Device (D2D) service is capable of acquiring and sharing information desired by a user by constructing a communication link between devices in a space where no communication infrastructure is built.

A device acquires synchronization with a peripheral device so as to provide the D2D service. The device supporting the D2D service searches the peripheral device using a preset time point and resource, and acquires device information of the peripheral device. The device information includes identification information of a device, and interests and application program information of a device user.

As described above, a device searches a peripheral device using a preset resource during a preset search duration. That is, the device receives device information broadcasted by peripheral devices and searches the peripheral devices through the preset resource during the search duration. The device broadcasts its own device information to the peripheral devices through the preset resource during the search duration so that the peripheral devices can search the device.

If a transmission frequency of a device and a reception frequency thereof are the same, the device cannot perform signal transmission and reception at the same time. Therefore, the device is not able to receive device information broadcasted by peripheral devices, while the device broadcasts its own device information during a search duration.

SUMMARY OF THE INVENTION

The present invention has been made to address at least the above problems and/or disadvantages and to provide at least the advantages below. Accordingly, one aspect of the present invention provides an apparatus and method for providing a D2D service.

Another aspect of the present invention provides an apparatus and method for searching a peripheral device in a system supporting a D2D service.

A further aspect of the present invention provides an apparatus and method for reducing overhead resulting from a peripheral device search in a system supporting a D2D service.

According to one aspect of the present invention, a method is provided for transmitting device information in a device supporting a D2D service. First information and second information are determined from device information. The first information is transmitted using a first tone from among a plurality of tones in a first region of a search duration. A second tone to transmit the first information is determined by transposing a subcarrier index of the first tone and a symbol index of the first tone. The first information is transmitted through the second tone in a second region of the search duration. The second information is transmitted through a resource region corresponding to the first tone in a third region of the search duration.

According to another aspect of the present invention, a method is provided for searching for a peripheral device in a device supporting a D2D service. First information of a peripheral device is received from the peripheral device using a first resource, which is not transmitting first information of the device, in a first region of a search duration and a second region of the search duration. Second information of the peripheral device is received from the peripheral device using a second resource, which is not transmitting second information of the device, in a third region of the search duration. Device information of the peripheral device is determined by combining the first information of the peripheral device and the second information of the peripheral device.

According to a further another aspect of the present invention, an electronic device is provided that includes a transmission unit for transmitting a signal to a peripheral device. The electronic device also includes a controller for controlling transmission of first information of device information using a first tone from among a plurality of tones in a first region of a search duration, determination of a second tone by transposing a subcarrier index of the first tone and a symbol index of the first tone, transmission of the first information through the second tone in a second region of the search duration, and transmission of second information of the device information through a resource region corresponding to the first tone in a third region of the search duration.

According to a yet another aspect of the present invention, an electronic device is provided that includes a reception unit for receiving first information of a peripheral device from the peripheral device using a first resource, which is not transmitting first information of the electronic device, in a first region of a search duration and a second region of the search duration, and receiving second information of the peripheral device from the peripheral device using a second resource, which is not transmitting second information of the electronic device, in a third region of the search duration. The electronic device also includes a controller for determining device information of the peripheral device by combining the first information of the peripheral device and the second information of the peripheral device.

BRIEF DESCRIPTION OF THE DRAWINGS

The above and other aspects, features and advantages of the present invention will become more apparent from the following detailed description when taken in conjunction with the accompanying drawings, in which:

FIGS. 3A and 3B are diagrams illustrating a construction of a tone transmission duration of a search duration, according to another embodiment of the present invention;

DETAILED DESCRIPTION OF EMBODIMENTS OF THE PRESENT INVENTION

Figure 1:
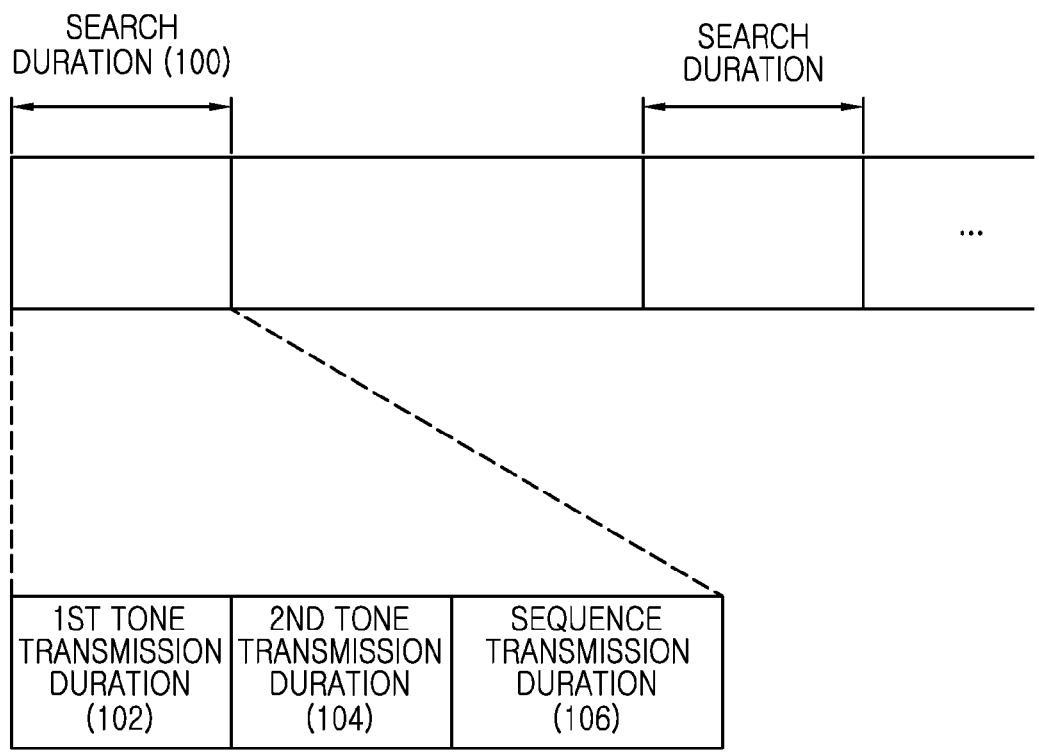
FIG. 1 is a diagram illustrating a search duration for searching a peripheral device, according to an embodiment of the present invention.

Embodiments of the present invention are described in detail with reference to the accompanying drawings. The same or similar components are designated by the same or similar reference numerals although they are illustrated in different drawings. Detailed descriptions of constructions or processes known in the art may be omitted to avoid obscuring the subject matter of the present invention. Terms described below, which are defined considering functions in the present invention, can be different depending on user and operator's intention or practice. Therefore, the terms should be defined on the basis of the disclosure throughout this specification.

The present invention describes a technology for searching a peripheral device in a system supporting a D2D service.

In the following description, a device of the system supporting the D2D service divides its own device information into first information, which is to be transmitted on a tone basis, and second information, which is to be transmitted on a sequence basis. The first information and the second information are transmitted by the device. The device information includes, for example, identification information of a device, interests and application program information of a device user, and the like.

FIG. 1 is a diagram illustrating a search duration for searching a peripheral device, according to an embodiment of the present invention.

As illustrated in FIG. 1, a system supporting a D2D service sets a search duration 100 for searching between devices. That is, the devices supporting the D2D service search peripheral devices during the search duration 100. During the search duration 100, the devices supporting the D2D service transmit their own device information so that the peripheral device searches its own device information. The search duration 100 exists at regular periods.

The search duration 100 includes a first tone transmission duration 102, a second tone transmission duration 104, and a sequence transmission duration 106.

Figure 2:
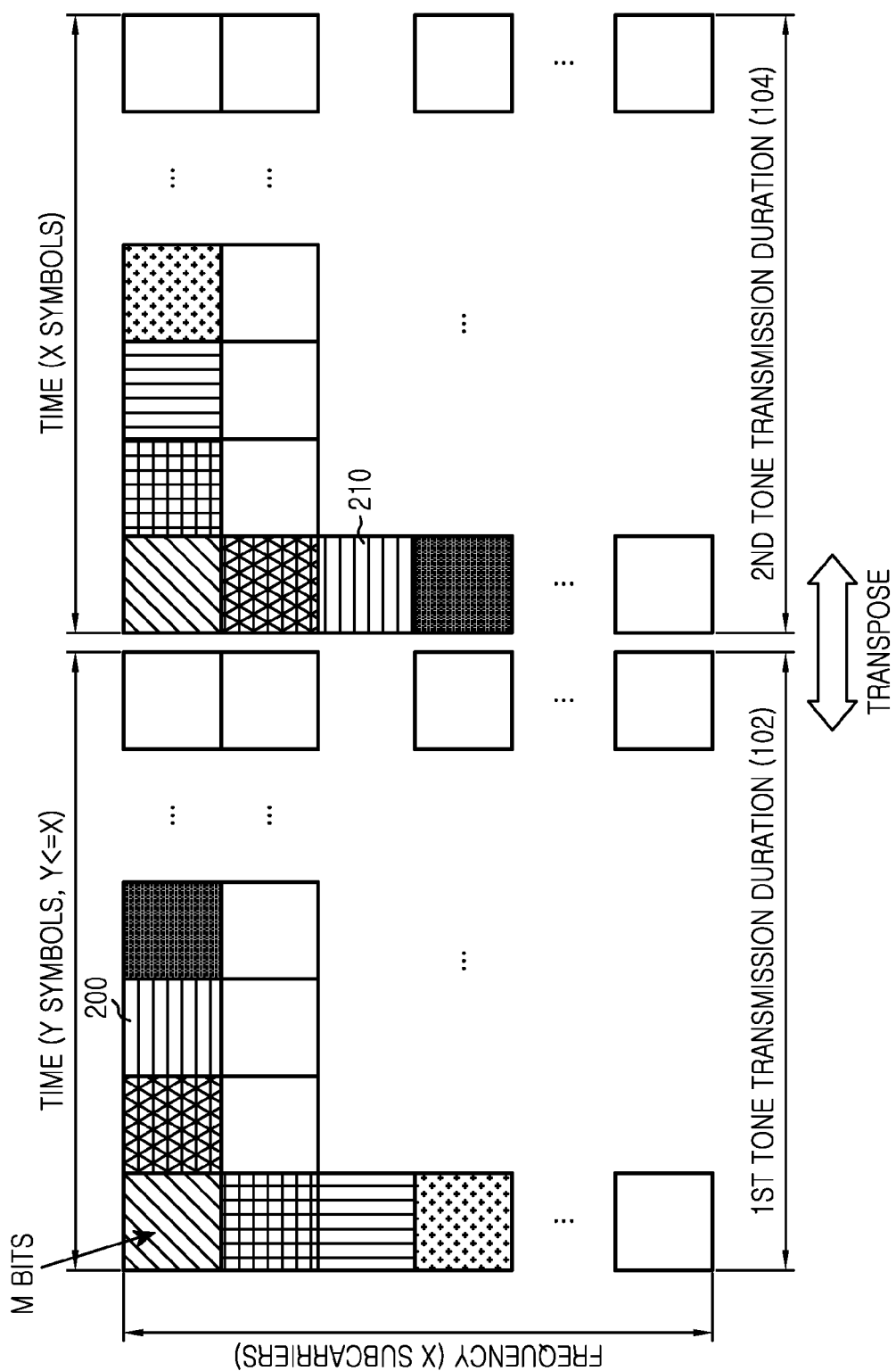
FIG. 2 is a diagram illustrating a construction of a tone transmission duration of a search duration, according to an embodiment of the present invention.

The device transmits first information that is part of its own device information during the first tone transmission duration 102 using a specific tone included in the first tone transmission duration 102. Each tone included in the first tone transmission duration 102 is mapped with first information of each device on a one-to-one basis. For example, when the first tone transmission duration 102 is composed of 'X' number of subcarriers and 'Y' number of symbols, as illustrated in FIG. 2, the device extracts 'M' bits (log 2 (X×Y)) of first information from its own device information. The device then broadcasts the 'M' bits of first information using any one tone of the first tone transmission duration 102 mapped to the first information. Mapping information between the first information of the device and the tone of the first tone transmission duration 102 can be determined considering identification information of the device or a tone index, dependent on the 'M' bits.

The device transmits the first information that is the part of its own device information during the second tone transmission duration 104 using a specific tone included in the second tone transmission duration 104. The device transposes a resource index of the tone having transmitted the first information in the first tone transmission duration 102, and determines a tone that is to transmit the first information in the second tone transmission duration 104. For example, as illustrated in FIG. 2, when a first device transmits first information using a tone 200 composed of a first subcarrier and a third symbol in the first tone transmission duration 102, the first device transmits the first information using a tone 210 composed of a third subcarrier and a first symbol in the second tone transmission duration 104. When the numbers of subcarriers and symbols constructing the first tone transmission duration 102 are different from each other, the number of symbols constructing the first tone transmission duration 102 and the second tone transmission duration 104 may be different. The first information that the device transmits during the first tone transmission duration 102 is the same as the first information that the device transmits during the second tone transmission duration 104.

Figure 3A:
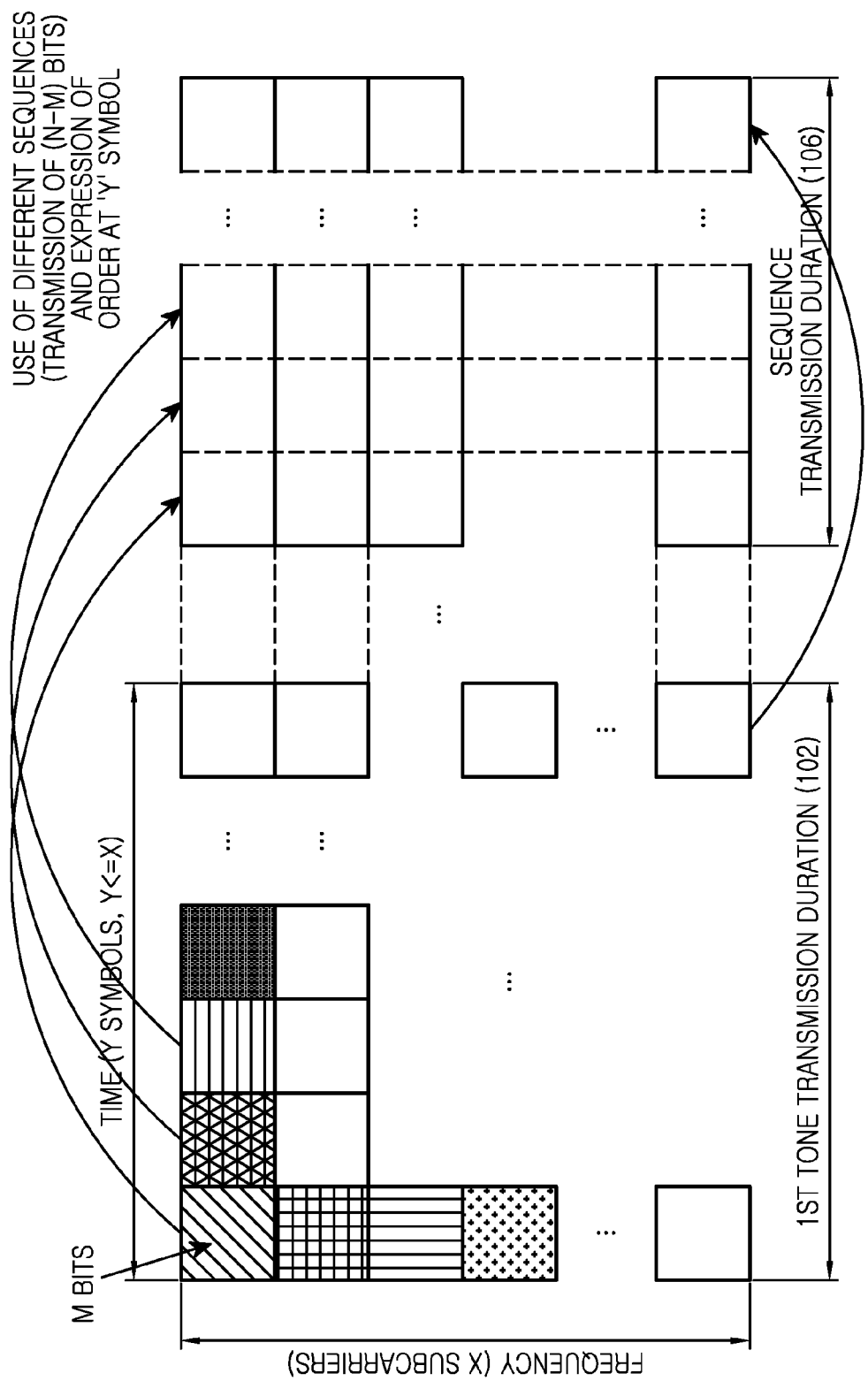

The device transmits second information included in its own device information during the sequence transmission duration 106. The device transmits the second information using at least one symbol of the sequence transmission duration 106 corresponding to an order of an index of the tone used for transmitting the first information in the first tone transmission duration 102. For example, as illustrated in FIG. 3A, the first tone transmission duration 102 can allot a tone index preferentially in a symbol direction. If a first device transmits first information using tone 3 composed of a first subcarrier and a third symbol, the first device transmits second information using a third symbol region in the sequence transmission duration 106.

In accordance with another example illustrated in FIG. 3B, the first tone transmission duration 102 can allot a tone index preferentially in a subcarrier direction. If a second device transmits first information using tone 3 composed of a third subcarrier and a first symbol, the second device transmits second information using a third symbol region in the sequence transmission duration 106.

The device can use a plurality of symbols in the sequence transmission duration 106 depending on a sequence length of the second information. The device can also transmit the second information using the entire sequence, or using a partial sequence depending on an amount of the second information. The symbol region includes at least one symbol.

A symbol of the sequence transmission duration 106 is mapped with a tone of the first tone transmission duration 102 on a one-to-one, or one-to-many, basis. That is, the device having transmitted the first information using tone 5 during the first tone transmission duration 102 transmits second information using a fifth symbol region in the sequence transmission duration 106. The symbol (i.e., the fifth symbol region) of the sequence transmission duration 106 may be mapped, on a one-to-one, or one-to-many, basis, with the tone (i.e., tone 5) having transmitted the first information in the first tone transmission duration 102. For example, when the first information is transmitted through only tone 1, tone 5 and tone 7 during the first tone transmission duration 102, a device having transmitted the first information through the 1 tone transmits second information using a first symbol region of the sequence transmission duration 106. The device having transmitted the 1st information through tone 5 also transmits the second information using a second symbol region of the sequence transmission duration 106. The device having transmitted the first information through tone 7 also transmits the second information using a third symbol region of the sequence transmission duration 106. the first symbol region, the second symbol region, and the third symbol region may be located contiguously or may be spaced apart by a constant interval.

As described above, each tone included in the first and second tone transmission durations 102 and 104 is mapped with the first information of each device on a one-to-one basis. The first information of the device mapped to each tone included in the first tone transmission duration 102 may be varied depending on time. Also, the first information of the device can be mapped with the tones included in the first and second tone transmission durations 102 and 104, on a one-to-many basis. That is, one first information may be mapped to a plurality of tones.

As described above, a device transmits second information using at least one symbol of the sequence transmission duration 106 corresponding to an order of an index of a tone used for transmitting the first information in the first tone transmission duration 102. The sequence transmission duration 106 includes at least a number of symbols that is the same as the number of tones included in the first tone transmission duration 102. Further, the device may add connection information of the first information and the second information, to the second information, and transmit the connection information. For example, the device can use a Cyclic Redundancy Check (CRC) for device information, as the connection information of the first information and the second information. In detail, a first device generates 'N' bits of device information that includes a CRC for its own device information. The first device then transmits the 'M' bits of first information among the 'N' bits through the first tone transmission duration 102 and the second tone transmission duration 104 to a second device, and transmits the remnant (N−M) bits of second information through the sequence transmission duration 106 to the second device. Therefore, the second device can verify the effectiveness of the received device information using the CRC of the first information received through the first tone transmission duration 102 and the second tone transmission duration 104 and the second information received through the sequence transmission duration 106. The CRC added to the device information is configured to have a preset length.

As described above, a device transposes a resource that is to transmit the first information in the first tone transmission duration 102 and the second tone transmission duration 104, thereby making a difference between a symbol having transmitted the first information in the first tone transmission duration 102 and a symbol which is to transmit the first information in the second tone transmission duration 104. The device can search device information about all peripheral devices located around the device. For example, during the first tone transmission duration 102 of FIG. 1, a first device transmits first information using a tone composed of a first subcarrier and a first symbol, a second device transmits first information using a tone composed of a second subcarrier and the first symbol, and a third device transmits first information using a tone composed of a third subcarrier and the first symbol. In the second tone transmission duration 104, through transposition, the first device transmits the first information using a tone composed of a first subcarrier and a first symbol, the second device transmits the first information using a tone composed of the first subcarrier and a second symbol, and the third device transmits the first information using a tone composed of the first subcarrier and a third symbol. Thus, the first device can receive, through the second symbol and the third symbol of the second tone transmission duration 104. The first device cannot receive the first information of the second device and the third device through the first symbol of the first tone transmission duration 102 because it transmits the first information through the first symbol of the first tone transmission duration 102.

Figure 4:
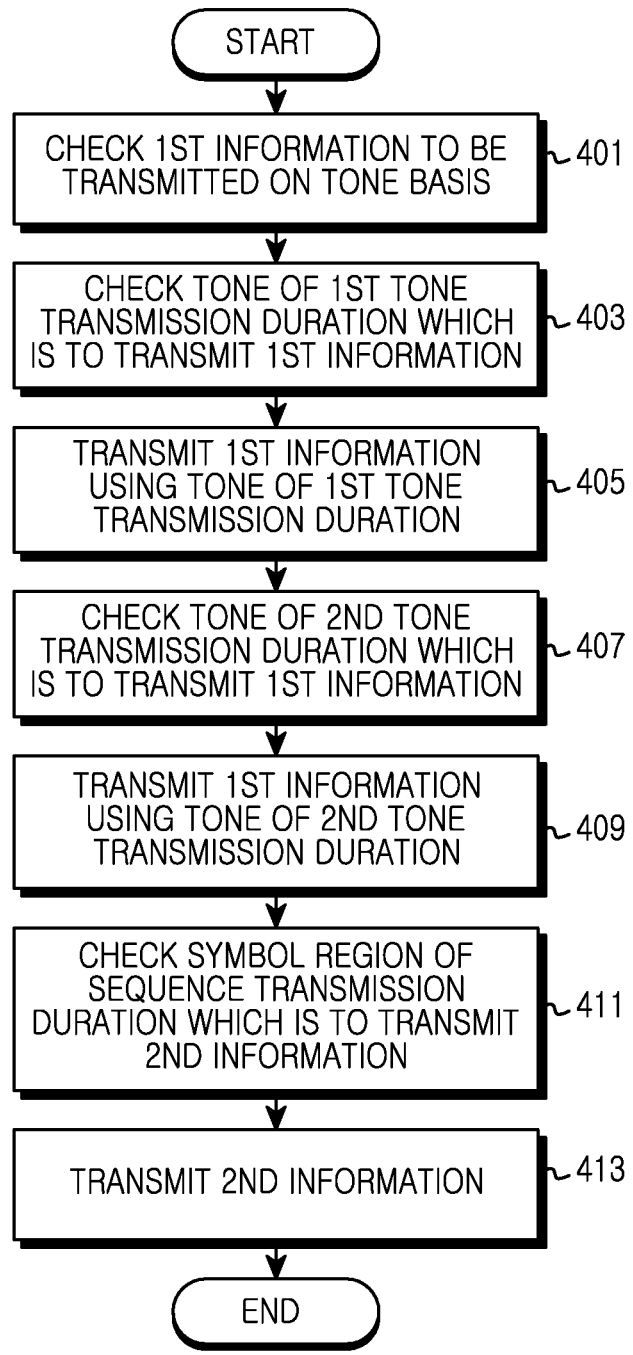
FIG. 4 is a flowchart illustrating a device information transmission methodology, according to an embodiment of the present invention.

FIG. 4 is a flowchart illustrating a device information transmission methodology, according to an embodiment of the present invention.

Referring to FIG. 4, in step 401, the device checks first information to be transmitted on a tone basis among its own device information. For example, the device extracts 'M' bits of first information to be transmitted on the tone basis from among 'N' bits of its own device information. 'M' is less than the 'N'.

After extracting the first information, a tone of a first tone transmission duration, which is to transmit the first information, is checked in step 403. For example, each tone included in the first tone transmission duration is mapped with first information of each device supporting a D2D service, on a one-to-one basis. The device checks any one tone mapped to the first information, among tones of the first tone transmission duration. Mapping information between the first information of the device and the tone of the first tone transmission duration can be determined considering identification information of the device or a tone index, dependent on the 'M' bits.

The device transmits the first information through the tone of the first tone transmission duration, in step 405. For example, as illustrated in FIG. 2, the device broadcasts the first information through the tone 200 composed of a first subcarrier and a third symbol in the first tone transmission duration 102.

After transmitting the first information through the first tone transmission duration, the device checks a tone that is to transmit the first information in a second tone transmission duration, in step 407. The device transposes a resource index of the tone having transmitted the first information in the first tone transmission duration, and determines the tone which is to transmit the first information in the second tone transmission duration. For example, as illustrated in FIG. 2, when the device has transmitted the first information using the tone 200 composed of the first subcarrier and the third symbol in the first tone transmission duration 102, the device determines a tone 210 composed of a third subcarrier and a first symbol in the second tone transmission duration 104, as a tone for transmitting the first information.

The device transmits the first information through the tone of the second tone transmission duration 104, in step 409. The first information that the device transmits during the first tone transmission duration is the same as the first information that the device transmits during the second tone transmission duration.

After transmitting the first information through the second tone transmission duration, in step 411, the device checks a symbol region which is to transmit second information in a sequence transmission duration, based on the tone used to transmit the first information through the first tone transmission duration 102. For example, as illustrated in FIG. 3A, when the first tone transmission duration 102 allots a tone index in a symbol direction, the device can transmit the first information using tone 3 composed of a first subcarrier and a third symbol in the first tone transmission duration 102. The device recognizes a third symbol region corresponding to tone 3 in the sequence transmission duration 106, as a region which is to transmit the second information. In another example in FIG. 3B, when the first tone transmission duration 102 allots a tone index in a subcarrier direction, the device can transmit the first information using tone 3 composed of a third subcarrier and a first symbol in the first tone transmission duration 102. In this case, the device recognizes a third symbol region corresponding to tone 3 in the sequence transmission duration 106, as a region which is to transmit the second information. The 2nd information includes the remnant part of the device information of the device, after the first information is removed. The symbol region includes at least one symbol for transmitting the second information.

After checking the symbol region that is to transmit the second information, the device transmits the second information through the checked symbol region, in step 413. A transmission distance of the second information transmitted on a sequence basis through channel coding no longer becomes shorter than a transmission distance of the first information having been transmitted on a tone basis. The device can also transmit the second information using the entire sequence or using a partial sequence depending on an amount of the second information. The methodology of FIG. 4 terminates after step 413.

In the above-described embodiment of the present invention, the device determines at least one symbol of the sequence transmission duration 106 corresponding to order of an index of a tone used for transmitting first information in the first tone transmission duration 102, as a symbol region for transmitting second information. When the devices have the same first information, they can transmit second information using the same symbol region in the sequence transmission duration 106. Thus, each device may additionally transmit connection information of the first information and the second information. For example, the device can use a CRC for device information, as the connection information of the first information and the second information. Specifically, a first device generates 'N' bits of device information including a CRC for its own device information. The first device then transmits 'M' bits of first information from among the 'N' bits through the first tone transmission duration 102 and the second tone transmission duration 104, and transmits the remnant (N–M) bits of second information through the sequence transmission duration 106. Therefore, a second device can verify the effectiveness of the device information using the CRC of the first information received through the first tone transmission duration 102 and the second tone transmission duration 104 and the second information received through the sequence transmission duration 106. The CRC added to the device information is constructed to have a preset length.

Figure 5:
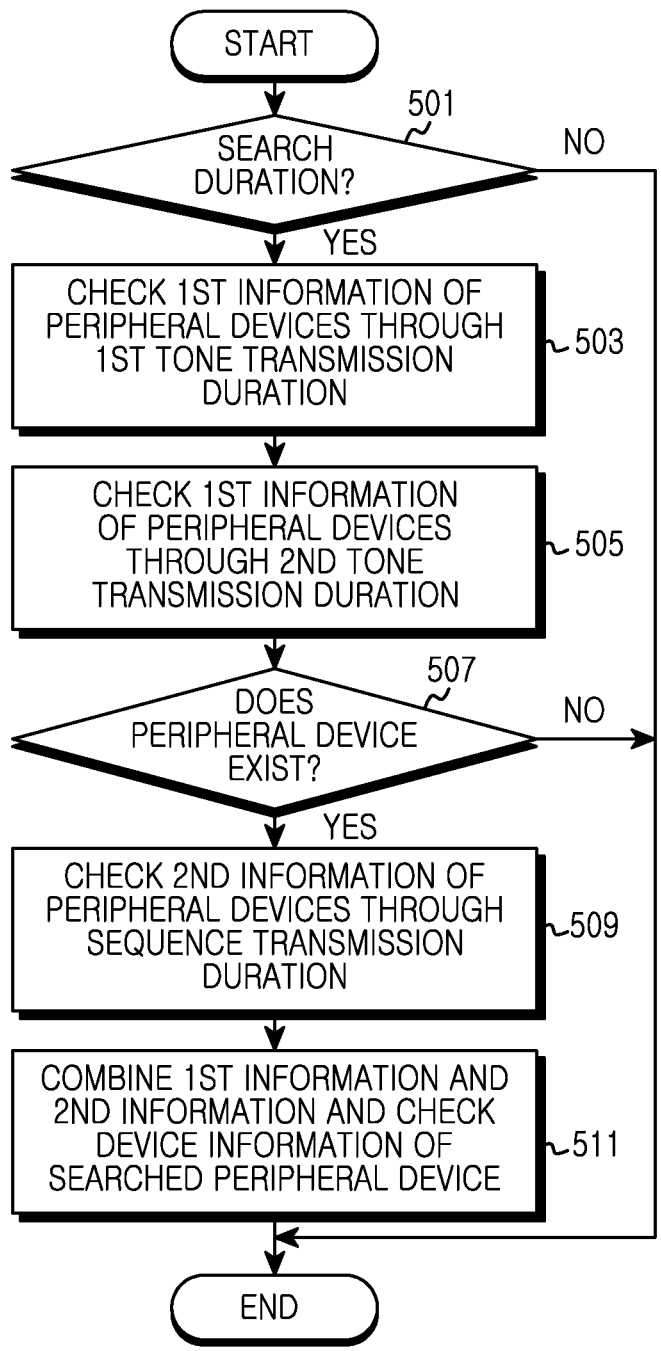
FIG. 5 is a flowchart illustrating a peripheral device search methodology, according to an embodiment of the present invention.

FIG. 5 is a diagram illustrating a peripheral device search methodology, according to an embodiment of the present invention.

Referring to FIG. 5, the device checks if a search duration arrives in step 501.

If the search duration has not arrived, the methodology terminates. That is, the device performs peripheral device search during the search duration.

If the search duration arrives, the device receives first information transmitted by peripheral devices in symbols that are not transmitting the device's own first information, during a first tone transmission duration, in step 503.

The device receives the first information transmitted by the peripheral devices in symbols that are not transmitting the device's own first information, during a second tone transmission duration, in step 505.

The device determines whether at least one peripheral device capable of performing communication exists, in step 507. That is, the device checks if the first information received through the first tone transmission duration and the second tone transmission duration exists.

If it is determined the peripheral device capable of performing the communication does not exist, the methodology terminates.

If it is determined that the peripheral device capable of performing communication exists, the device receives second information transmitted by the peripheral devices through symbols not transmitting the device's own second information, during a sequence transmission duration, in step 509.

The device combines the first information and the second information and checks device information of at least one peripheral device, in step 511. For example, a peripheral device transmits second information using a symbol region corresponding to a tone used for transmitting first information in the first tone transmission duration. The device receives, from the peripheral device, the second information through the symbol region corresponding to the tone having received the first information. In another embodiment of the present invention, a peripheral device may transmit second information using the same subcarrier as a subcarrier of a tone used for transmitting first information in the first tone transmission duration. The device then receives, from the peripheral device, the second information through the same subcarrier as the subcarrier of the tone having received the first information. The methodology of FIG. 5 terminates after step 511.

When a plurality of peripheral devices are searched, the device may select at least one peripheral device connecting a communication link, based on device information of each peripheral device.

In the above-described embodiments of the present invention, the device combines first information with second information received from a peripheral device through a symbol region corresponding to an index of a tone having received the first information or through the same subcarrier as a subcarrier of the tone, and checks device information of the peripheral device.

Figure 6:
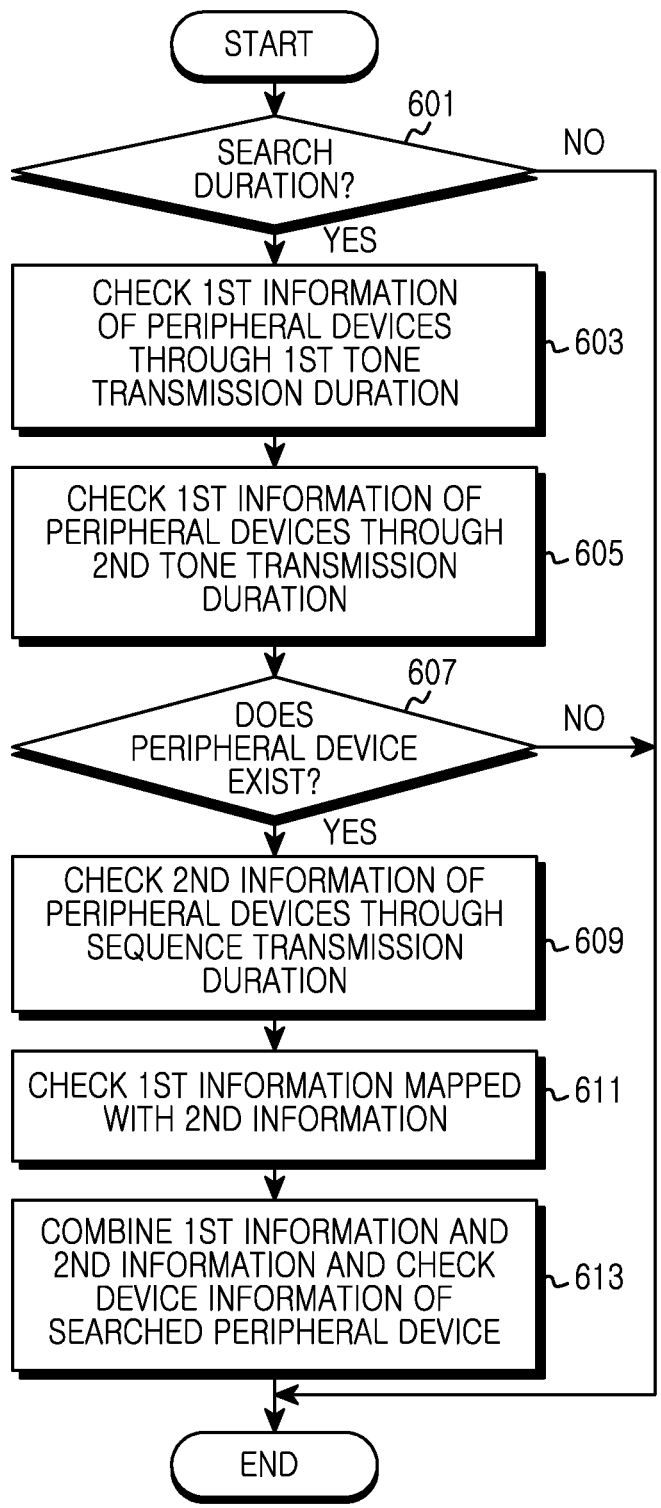
FIG. 6 is a flowchart illustrating a peripheral device search methodology, according to another embodiment of the present invention.

In another embodiment of the present invention, as illustrated in FIG. 6, a device may combine first information and second information using connection information of the first information and the second information, which is received together with the second information from a peripheral device, and check device information of the peripheral device.

FIG. 6 is a flowchart illustrating a procedure for searching a peripheral device in a device, according to another embodiment of the present invention.

Referring to FIG. 6, the device checks if a search duration arrives, in step 601.

If the search duration has not arrived, the methodology of FIG. 6 terminates. That is, the device performs peripheral device search during the search duration.

If the search duration arrives, the device receives first information transmitted by peripheral devices in symbols not transmitting the device's own first information, during a first tone transmission duration, in step 603.

The device receives the first information transmitted by the peripheral devices during a symbol not transmitting the device's own first information during a second tone transmission duration, in step 605.

The device determines if at least one peripheral device capable of performing communication exists. That is, the device determines if the first information received through the first tone transmission duration and the second tone transmission duration exists.

If it is determined that the peripheral device capable of performing the communication does not exist, the methodology of FIG. 6 terminates.

If it is determined that the peripheral device capable of performing the communication exists, the device receives second information transmitted by the peripheral devices through a symbol not transmitting the device's own second information, during a sequence transmission duration, in step 609.

The device checks connection information of the first information and the second information, which is received together with the second information through the sequence transmission duration, in step 611. The connection information includes symbol order information of a tone having received the first information in the first tone transmission duration.

After checking the connection information of the first information and the second information, the device combines the first information and the second information according to the connection information of the first information and the second information, and checks device information of at least one peripheral device, in step 613. For example, when the device uses a CRC of device information as the connection information of the first information and the second information, the device verifies the effectiveness of the device information composed of the first information and the second information using the CRC of the first information and the second information. The device recognizes the effectiveness-verified device information as being the device information of the peripheral device. The methodology of FIG. 6 terminates after step 613.

When a plurality of peripheral devices are searched, the device may select at least one peripheral device connecting a communication link based on device information of each peripheral device.

Figure 7:
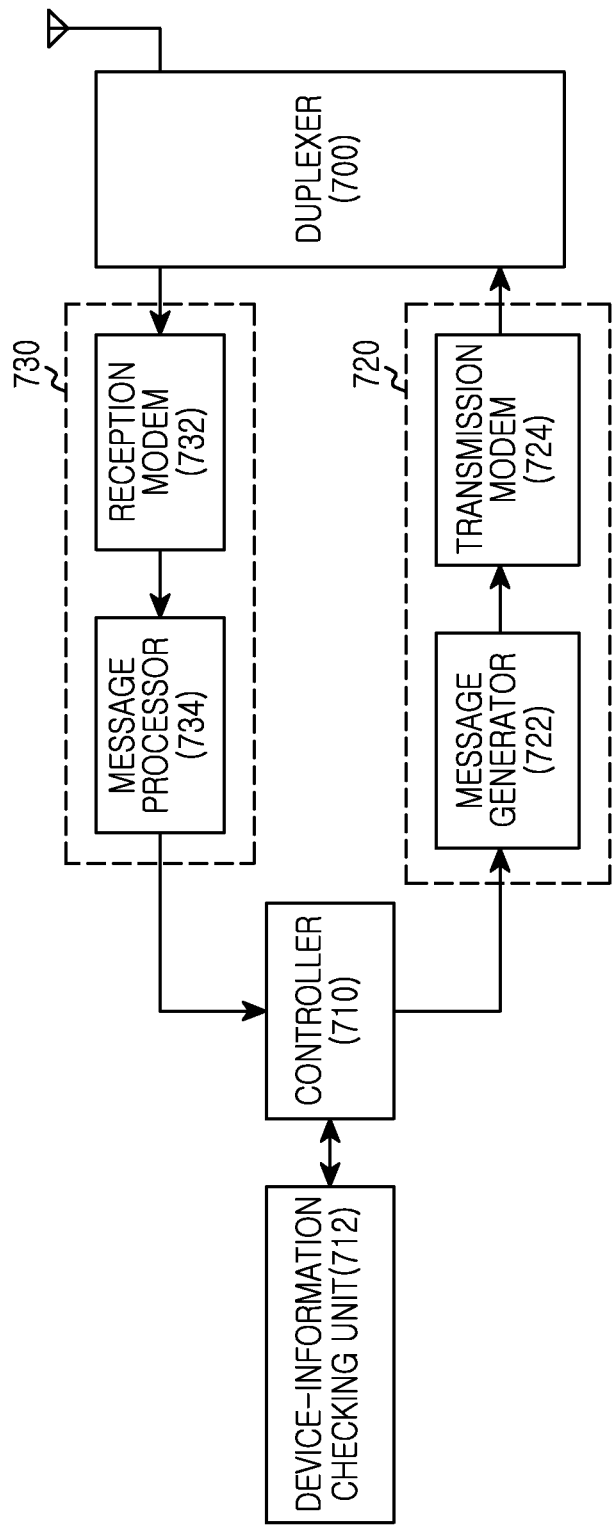
FIG. 7 is a block diagram illustrating a construction of a device supporting a D2D service, according to an embodiment of the present invention.

FIG. 7 is a diagram illustrating a construction of a device supporting a D2D service, according to an embodiment of the present invention.

As illustrated in FIG. 7, the device includes a duplexer 700, a controller 710, a device-information checking unit 712, a transmission unit 720, and a reception unit 730.

The duplexer 700 transmits a transmit signal provided from the transmission unit 720 according to a duplexing scheme through an antenna, and provides a receive signal from the antenna to the reception unit 730.

The controller 710 controls a general operation of the device. In detail, the controller 710 controls the search for a peripheral device during a search duration.

The controller 710 controls transmission of the device's own device information during the search duration, as illustrated in FIG. 4. At this time, the controller 710 controls the division of the device's own device information into first information which is to be transmitted on a tone basis and second information which is to be transmitted on a sequence basis, and controls the transmission of the divided first information and second information.

When transmitting the first information on the tone basis, the controller 710 controls transmission of the first information through a tone mapped to the first information during a first tone transmission duration. The controller 710 controls transmission of the first information through a tone of a second tone transmission duration determined by transposing a resource index of the tone having transmitted the first information in the first tone transmission duration. For example, as illustrated in FIG. 2, when the device has transmitted the first information using a tone 200 composed of a first subcarrier and a third symbol in the first tone transmission duration 102, the controller 710 controls transmission of the first information using a tone 210 composed of a third subcarrier and a first symbol in the second tone transmission duration 104.

When transmitting the second information which is to be transmitted on the sequence basis, the controller 710 controls transmission of the second information through a second information transmission region of a sequence transmission duration, which is determined based on tone information used for transmitting the first information in the first tone transmission duration. For example, the controller 710 controls transmission of the second information using a symbol region of the sequence transmission duration corresponding to an order of an index of the tone used for transmitting the first information in the first tone transmission duration. In detail, as illustrated in FIG. 3A, the first tone transmission duration 102 allots a tone index in a symbol direction. If a device transmits first information using tone 3, composed of a first subcarrier and a third symbol, the controller 710 controls transmission of second information using a third symbol region in the sequence transmission duration 106. On the other hand, as illustrated in FIG. 3B, the first tone transmission duration 102 may allot a tone index in subcarrier direction. If a device transmits first information using tone 3, composed of a third subcarrier and a first symbol, the controller 710 controls transmission of second information using a third symbol region in the sequence transmission duration 106. In another example, the controller 710 transmits the second information using the same subcarrier as that of the tone used for transmitting the first information in the first tone transmission duration.

As illustrated in FIG. 5 or FIG. 6, the controller 710 controls reception of device information of a peripheral device using a resource not used to transmit the device's own device information during a search duration.

The device-information checking unit 712 constructs device information of a searched peripheral device according to control of the controller 710. For example, the device-information checking unit 712 checks a symbol region corresponding to a tone index of a tone having received first information. The device-information checking unit 712 combines the first information with second information received through the symbol region, and checks device information of a peripheral device. In another example, the device-information checking unit 712 checks connection information of first information and second information, which is received together with the second information through a sequence transmission duration. The device-information checking unit 712 combines the first information and the second information according to the connection information of the first information and the second information, and checks device information of at least one peripheral device. The connection information includes symbol order information of the tone having received the first information in the first tone transmission duration, or CRC information of the device information.

The transmission unit 720 transmits data and a control message to be transmitted to peripheral devices, to the duplexer 700. For example, the transmission unit 720 includes a message generator 722 and a transmission modem 724.

The message generator 722 generates a control message to be transmitted to peripheral devices according to control of the controller 710. For example, the message generator 722 generates first information to be transmitted on a tone basis and second information to be transmitted on a sequence basis. The message generator 722 may generate connection information of the first information and the second information, which is to be transmitted together with the second information. The connection information includes symbol order information of a tone having received the first information in the first tone transmission duration, or CRC information of device information.

The transmission modem 724 provides a conversion to transmit data to be transmitted to peripheral devices and a control message generated in the message generator 722 through a wireless resource, and transmits the converted data and control message to the duplexer 700.

The reception unit 730 receives data and a control message transmitted by peripheral devices, from the duplexer 700. For example, the reception unit 730 includes a reception modem 732 and a message processor 734.

The reception modem 732 converts data and a control message received from peripheral devices provided from the duplexer 700, into a digital signal of a baseband.

The message processor 734 analyzes a control message provided from the reception modem 732, extracts first information and second information of a peripheral device, and transmits the first information and the second information to the controller 710.

In the above-described construction of FIG. 7, the controller 710, which is a protocol controller, can perform a function of the device-information checking unit 712. In an embodiment of the present invention, these elements are separately constructed and shown in order to distinguish and describe respective functions. Thus, in actual realization, construction can be such that all or some of the functions are processed in the controller 710.

As described above, there is an advantage of being able to reduce overhead resulting from a peripheral device search, by repeatedly transmitting only part of its own device information in the tone unit, in a device of a system supporting a D2D service.

Also, there is an advantage of being able to search all peripheral devices transmitting device information, when repeatedly transmitting only part of device information in the tone unit in a device, by transposing mapping of a tone and the device information and repeatedly transmitting the device information.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method for transmitting device information for a Device To Device (D2D) service, the method comprising the steps of:
   transmitting, on a tone basis, a first information using a first tone in a first region;
   transmitting the first information through a second tone in a second region; and
   transmitting, on a sequence basis, a second information through a resource region including a plurality of tones in a third region,
   wherein the first information comprises a first part of bits of a device information,
   wherein the second information comprises a second part of the bits of the device information,
   wherein the second tone is located at a m-th symbol and a n-th subcarrier of the second region,
   wherein the m is a subcarrier index of the first tone and the n is a symbol index of the first tone,
   wherein at least one of a subcarrier and a symbol occupied by the resource region in the third region is determined based on at least one of the subcarrier index of the first tone and the symbol index of the first tone,
   wherein the first part of bits of the device information is identified based on a tone index of the first tone,
   wherein the tone index includes a symbol index and a subcarrier index of the first tone,
   wherein a size of the first information is determined based on a size of a frequency axis of the first region and a size of a time axis of the first region, and
   wherein mapping information between the first information and the first tone in the first region is determined based on the device information or tone index, dependent on the size of the first information.

2. The method of claim 1, wherein the device information comprises at least one of identification information of the device, interests, and application program information.

3. The method of claim 1, wherein the transmitting the first information comprises:
   determining the first tone, among tones in the first region of a search duration, based on the first information; and
   transmitting the first information using the first tone.

4. The method of claim 1, wherein the transmitting the second information comprises transmitting the second information through a set of tones in a n-th symbol or a set of tones in a m-th symbol of the third region.

5. The method of claim 1, wherein the transmitting the second information comprises transmitting the second information through a set of tones in a m-th subcarrier of the third region.

6. The method of claim 1, wherein the second information comprises connection information for verifying the device information determined by combining the first part of bits and the second part of bits, and
   wherein the connection information comprises at least one of a symbol order of the first tone in the first region and a Cyclic Redundancy Check (CRC) of the device information.

7. The method of claim 1, further comprising:
   receiving a part of bits of device information of another device through at least one of a tone in the n-th subcarrier of the second region.

8. A method for receiving device information for a device supporting a Device To Device (D2D) service, the method comprising the steps of:
receiving, on a tone basis, a first information of another device through at least one of a first tone in a first region and a second tone in a second region;
receiving, on a sequence basis, second information of the another device through a resource region including a plurality of tones in a third region,
wherein the first information comprises a first part of bits of a device information,
wherein the second information comprises a second part of the bits of the device information,
wherein the second tone is located at a m-th symbol and a n-th subcarrier of the second region,
wherein the m is a subcarrier index of the first tone and the n is a symbol index of the first tone,
wherein at least one of a subcarrier and a symbol occupied by the resource region in the third region is determined based on at least one of the subcarrier index of the first tone and the symbol index of the first tone,
wherein the first part of bits of the device information is identified based on a tone index of the first tone,
wherein the tone index includes a symbol index and a subcarrier index of the first tone,
wherein a size of the first information is determined based on a size of a frequency axis of the first region and a size of a time axis of the first region, and
wherein mapping information between the first information and the first tone in the first region is determined based on the device information or tone index, dependent on the size of the first information.

9. The method of claim 8, further comprising:
determining the device information of the another device by combining the first information and the second information.

10. The method of claim 8, wherein the second information comprises connection information for verifying the device information determined by combining the first part of the bits and the second part of the bits, and
wherein the connection information comprises at least one of a symbol order of the first tone in the first region and a Cyclic Redundancy Check (CRC) of the device information.

11. The method of claim 8, wherein the receiving the second information comprises receiving the second information through a set of tones in a n-th symbol, a set of tones in a m-th symbol or a set of tones in a m-th subcarrier of the third region.

12. An electronic device comprising:
a transmission unit for transmitting, on a tone basis, a first information through a first tone in a first region, for transmitting the first information through a second tone in a second region, and for transmitting, on a sequence basis, a second information through a resource region including a plurality of tones in a third region,
wherein the first information comprises a first part of bits of a device information,
wherein the second information comprises a second part of the bits of the device information,
wherein the second tone is located at a m-th symbol and a n-th subcarrier of the second region,
wherein the m is a subcarrier index of the first tone and the n is a symbol index of the first tone,
wherein at least one of a subcarrier and a symbol occupied by the resource region in the third region is determined based on at least one of the subcarrier index of the first tone and the symbol index of the first tone,
wherein the first part of bits of the device information is identified based on a tone index of the first tone,
wherein the tone index includes a symbol index and a subcarrier index of the first tone,
wherein a size of the first information is determined based on a size of a frequency axis of the first region and a size of a time axis of the first region, and
wherein mapping information between the first information and the first tone in the first region is determined based on the device information or tone index, dependent on the size of the first information.

13. The electronic device of claim 12, wherein the device information comprises at least one of identification information of the device, interests, and application program information.

14. The electronic device of claim 12, wherein the transmission unit transmits the first information using the first tone, which is determined, among tones in the first region of a search duration, based on the first information.

15. The electronic device of claim 12, wherein the transmission unit transmits the second information through a set of tones in a n-th symbol or a set of tones in a m-th symbol of the third region.

16. The electronic device of claim 12, wherein the transmission unit transmits the second information through a set of tones in a m-th subcarrier of the third region.

17. The electronic device of claim 12, wherein the second information comprises connection information for verifying the device information determined by combining the first part of the bits and the second part of the bits, and
wherein the connection information comprises at least one of a symbol order of the first tone in the first region and a Cyclic Redundancy Check (CRC) of the device information.

18. The electronic device of claim 12, further comprising:
a reception unit for receiving a part of bits of device information of another device through at least one of a tone in the n-th subcarrier of the second region.

19. An electronic device comprising:
a reception unit for receiving, on a tone basis, a first information of another device through at least one of a first tone in a first region and a second tone in a second region, and, for receiving, on a sequence basis, a second information of the another device through a resource region including a plurality of tones in a third region,
wherein the first information comprises a first part of bits of the device information for the another device,
wherein the second information comprises a second part of the bits of the device information for the another device,
wherein the second tone is located at a m-th symbol and a n-th subcarrier of the second region,
wherein the m is a subcarrier index of the first tone and the n is a symbol index of the first tone,
wherein at least one of a subcarrier and a symbol occupied by the resource region in the third region is determined based on at least one of the subcarrier index of the first tone and the symbol index of the first tone,
wherein the first part of bits of the device information is identified based on a tone index of the first tone,
wherein the tone index includes a symbol index and a subcarrier index of the first tone, wherein a size of the first information is determined based on a size of a frequency axis of the first region and a size of a time axis of the first region, and wherein mapping information between the first information and the first tone in the first region is determined based on the device information or tone index, dependent on the size of the first information.

20. The electronic device of claim 19, further comprising:

a controller for determining the device information of the another device by combining the first information and the second information.

21. The electronic device of claim 19, wherein the second information comprises connection information for verifying the device information determined by combining the first part of the bits and the second part of the bits, and wherein the connection information comprises at least one of a symbol order of the first tone in the first region and a Cyclic Redundancy Check (CRC) of the device information.

22. The electronic device of claim 19, wherein the reception unit receives the second information through a set of tones in a n-th symbol, a set of tones in a m-th symbol or a set of tones in a m-th subcarrier of the third region.

* * * * *